United States Patent
Khosrowpour et al.

(10) Patent No.: US 10,560,535 B2
(45) Date of Patent: Feb. 11, 2020

(54) SYSTEM AND METHOD FOR LIVE MIGRATION OF REMOTE DESKTOP SESSION HOST SESSIONS WITHOUT DATA LOSS

(71) Applicant: Dell Products, LP, Round Rock, TX (US)

(72) Inventors: Farzad Khosrowpour, Pflugerville, TX (US); Senthil Kumaran Baladhandayutham, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 281 days.

(21) Appl. No.: 14/718,724

(22) Filed: May 21, 2015

(65) Prior Publication Data
US 2016/0344821 A1    Nov. 24, 2016

(51) Int. Cl.
*H04L 29/08* (2006.01)
*G06F 9/451* (2018.01)

(52) U.S. Cl.
CPC ............ *H04L 67/148* (2013.01); *G06F 9/452* (2018.02); *H04L 67/1029* (2013.01)

(58) Field of Classification Search
None
See application file for complete search history.

(56) References Cited

U.S. PATENT DOCUMENTS

| | | | |
|---|---|---|---|
| 2003/0110266 A1* | 6/2003 | Rollins | H04L 29/06 709/227 |
| 2006/0218285 A1* | 9/2006 | Talwar | G06F 9/5072 709/227 |
| 2007/0174410 A1* | 7/2007 | Croft | G06F 3/1415 709/208 |
| 2007/0198656 A1* | 8/2007 | Mazzaferri | G06F 3/1415 709/218 |
| 2009/0300407 A1* | 12/2009 | Kamath | G06F 9/505 714/4.11 |
| 2011/0208804 A1* | 8/2011 | Kuzhiyil | G06F 9/5038 709/203 |
| 2013/0031256 A1 | 1/2013 | Hampel | |
| 2013/0060842 A1* | 3/2013 | Grossman | H04L 12/4641 709/203 |
| 2013/0103798 A1* | 4/2013 | El Chami | H04L 65/1046 709/217 |
| 2013/0117359 A1* | 5/2013 | Husain | H04L 67/34 709/203 |
| 2013/0262629 A1 | 10/2013 | Zawacki et al. | |

(Continued)

*Primary Examiner* — Hamza N Algibhah
*Assistant Examiner* — Tony Williams
(74) *Attorney, Agent, or Firm* — Larson Newman, LLP (57) ABSTRACT

A remote desktop session host system includes a first terminal server including a first data collector, a second terminal server including a second data collector, and a data storage device. The first terminal server hosts a first terminal session. In response to determining that the first terminal server is underutilized, the first data collector creates a snapshot of the first terminal session, stores the snapshot on the data storage device, and logs off the first terminal session. The snapshot includes a context for the first terminal session. A second terminal session is launched on the second terminal server, and the second data collector retrieves the snapshot and provides the snapshot to the second terminal session to restore the context to the second session.

16 Claims, 5 Drawing Sheets

(56) References Cited

U.S. PATENT DOCUMENTS

2014/0115182 A1* 4/2014 Sabaa ................. H04L 67/1097
709/232
2014/0122730 A1 5/2014 Burch et al.
2014/0330784 A1* 11/2014 Sundaram ............... H04L 29/06
707/639

* cited by examiner

SYSTEM AND METHOD FOR LIVE MIGRATION OF REMOTE DESKTOP SESSION HOST SESSIONS WITHOUT DATA LOSS

FIELD OF THE DISCLOSURE

This disclosure generally relates to information handling systems, and more particularly relates to a system and method for live migration of remote desktop session host sessions without data loss.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
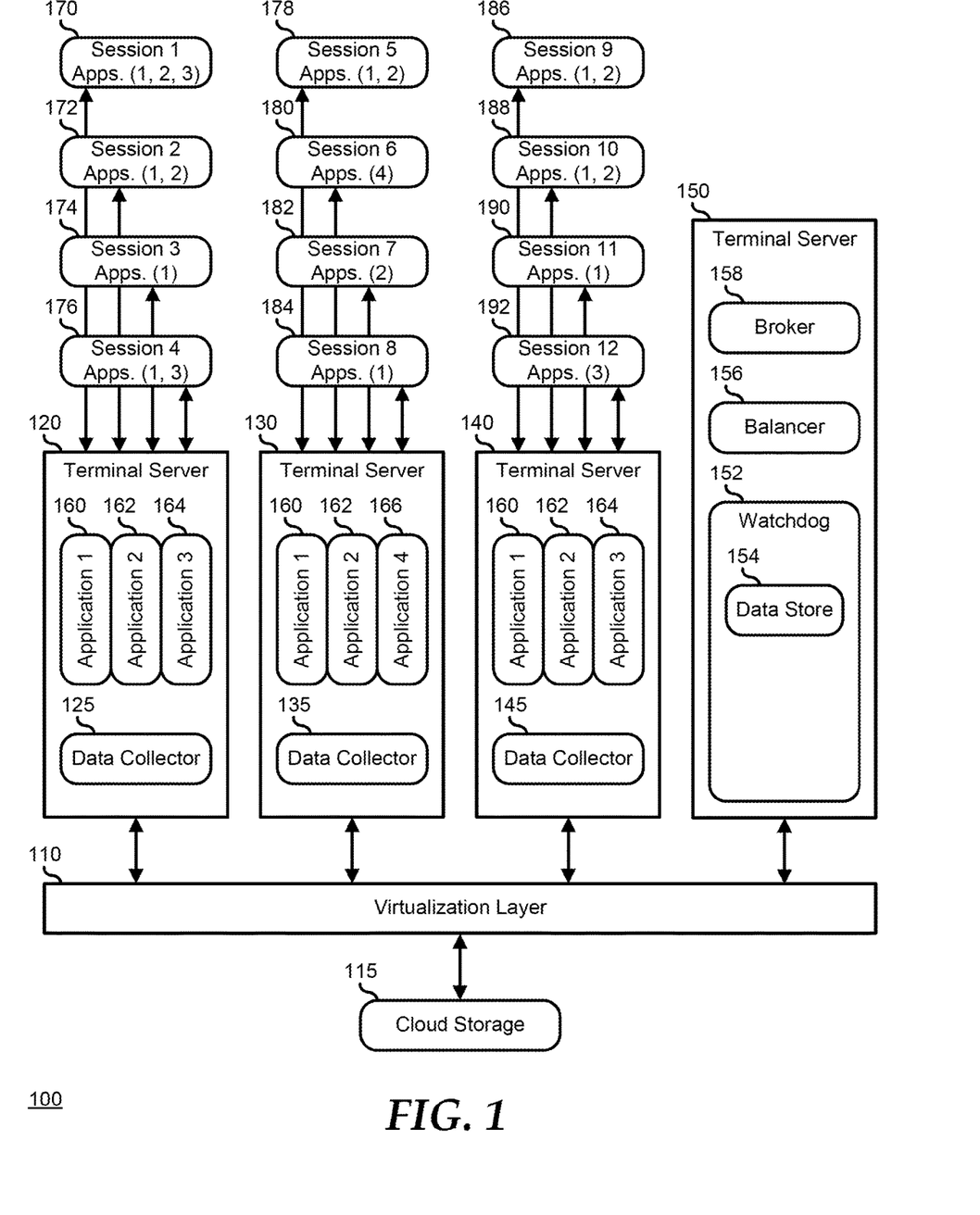
FIGS. 1-3 are block diagrams illustrating a Remote Desktop Session (RDSH) system according to an embodiment of the present disclosure.

FIG. 1 illustrates an embodiment of a Remote Desktop Session Host (RDSH) system 100. For the purpose of this disclosure, RDSH system 100 can be implemented by one or more information handling systems that can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

RDSH system 100 includes a virtualization layer 110, a cloud storage device 115, terminal servers 120, 130, 140, and 150. RDSH system 100 represents a virtual desktop system that permits multiple sessions 170 thru 192 to be hosted on terminal servers 120, 130, 140, and 150. In particular, RDSH system 100 can represent one or more server information handling systems that each operate to instantiate one or more virtual machines, where the virtual machines are configured to implement terminal servers 120, 130, 140, and 150 to host sessions 170 thru 192, where each hosted session is associated with a particular user of the virtual desktop system. In a particular embodiment, virtualization layer 110 represents a Virtual Machine Manager (VMM) or virtual machine hypervisor that operates to instantiate terminal servers 120, 130, 140, and 150, to provide virtual machine images to the terminal servers that enable the terminal servers to host the multiple sessions and that enable the users to access program, processing, data, and storage resources. In another embodiment, virtualization layer 110 represents multiple VMMs or hypervisors that operate across multiple server information handling systems and that provide for instantiation, deletion, and migration of terminal servers 120, 130, 140, and 150 between the multiple server information handling systems. In particular, the instantiation, deletion, or migration of terminal servers 120, 130, 140, and 150 can be performed to balance the resource utilization of system resources between the terminal servers and between the server information handling systems, based upon the number of sessions being hosted by each of the terminal servers and the amount of resources being utilized by each of the terminal servers, as needed or desired. RDSH system 100 is distinguished from a Virtual Desktop Infrastructure (VDI) in that, in the RDSH system, multiple sessions are hosted by a single virtual machine, where, in a VDI, each user is allocated a separate virtual machine.

Terminal server 120 includes a data collector 125, terminal server 130 includes a data collector 135, terminal server 140 includes a data collector 145, and terminal server 150 includes a watchdog 152, a load balancer 156, and a session broker 158, as described below. For the purposes of this disclosure, each of terminal servers 120, 130, 140, and 150 are assumed to be configured to support up to four sessions, and for each hosted session, the associated terminal server is configured to provide access to one or more hosted application to the sessions. In a particular embodiment, one or more of terminal servers 120, 130, 140, and 150 are configured as general purpose terminal servers, such that each such general purpose terminal server operates to host a variety of applications for the hosted session. Here, all of the applications accessed by a particular session are hosted on a common terminal server. In another embodiment, one or more of terminal servers 120, 130, 140, and 150 are configured as special purpose terminal servers, such that each such special purpose terminal server operates to host a single application or a subset of available applications for the hosted sessions. Here, each of the applications accessed by a particular session can be hosted on a different terminal server. In yet another embodiment, RDSH system 100 includes both general purpose terminal servers and special purpose terminal servers, as needed or desired.

As illustrated, terminal server 120 hosts sessions 170, 172, 174, and 176, terminal server 130 hosts sessions 178, 189, 182, and 184, and terminal server 140 hosts sessions 186, 188, 190, and 192. In particular, when session 170 is initiated on terminal server 120, during the course of operation of the session, applications 160, 162, and 164 are launched on the terminal server, in order to meet the processing needs of the session, as indicated by the application numbers (1, 2, 3). However, when session 172 is initiated on terminal server 120, during the course of operation of the session, applications 160 and 162 do not need to be re-launched, but are utilized in order to meet the processing needs of the session, as indicated by the application numbers (1, 2). Sessions 174 and 176 are similarly initiated on terminal server 120. On terminal server 130, sessions 178, 180, 182, and 184 are initiated and applications 160, 162, and 166 are launched, and on terminal server 140, and sessions 186, 188, 190, and 192 are initiated and applications 160, 162, and 164 are launched. Terminal server 150 is not shown as hosting any sessions, but this is not necessarily so, and terminal server 150 can operate to host sessions similarly to terminal servers 120, 130, and 140, in addition to operating load balancer 156, session broker 158, and watchdog 152, as described below.

Terminal servers 120, 130, and 140 operate to launch and disconnect respective sessions 170 thru 192, to prompt users to log on to and log off from the sessions, to display messages to the users, to launch and kill applications 160, 162, 164, and 166 and other processes as needed or desired, to enumerate the applications and processes that are running on the terminal servers. Data collectors 125, 135, and 145 operate to enumerate respective sessions 170-192. An example of the enumeration includes gathering information related to the monitoring of the connection state, user name information, client name information, display detail information, client reported IP address information, client build number information, other information related to the sessions, or a combination thereof. Data collectors 125, 135, and 145 also operate to establish and maintain policies regarding the connections of respective sessions 170 thru 192. In particular, data collectors 125, 135, and 145 operate to set time limits for respective sessions 170 thru 192 after which a session is shut down, to set time windows when one or more session is shut down, to provide user notifications that sessions are going to be shut down, to wait a predetermined amount of time and then to shut down the sessions, to, when all sessions are shut down, shut down the respective terminal server 120, 130, or 140, and to, when other terminal servers are running at or near a capacity level, power up another terminal server.

Watchdog 152 operates to discover and enumerate data collectors 120, 130, and 140, to receive session information from data collectors 125, 135, and 145, to store the session information in a data storage device 154, to provide policies to the data collectors, and to monitor resource allocations in terminal servers 120, 130, and 140. Working with watchdog 152, data collectors 125, 135, and 145 operate to discover which applications 160, 162, 164, and 166 are permitted to be launched on respective terminal servers 120, 130, and 140, to receive the policies from the watchdog, and to create snapshots 272, 274, and 286 for each session and store the snapshots on data storage device 154. Each snapshot 272, 274, and 286 includes the information gathered by data collectors 125, 135, and 145, as described above. In addition, each snapshot 272, 274, and 286 includes session and application setting information, terminal resolution information, local and roaming user profile information, session registry keys and application licensing information, session type information, disk, folder, and path mapping information, path exclusion information, other session or user specific information, application compatibility information, or a combination thereof.

By storing snapshots 272, 274, and 286 on data storage device 154, a session can be shut down on one terminal server, a session re-launched on another terminal server, and the snapshot information applied to the new session to seamlessly reestablish a clone of the original session on the other terminal server. In contrast, where one or more of terminal servers 120, 130, and 140 implement a standard Remote Desktop Protocol (RDP), a user profile disk (VHDX) is created that stores information on a terminal server. The VHDX information is similar to the snapshot information, but the VHDX mechanism is session-based, is restricted to a particular terminal server, and is not therefore persistent across multiple terminal servers. Because snapshots 272, 274, and 286 are stored in data storage device 154, the snapshots can be invoked to reestablish the clone of the original session.

Load balancer 156 operates to manage the distribution of terminal servers 120, 130, and 140 in RDSH system 100. In a first case, where the session load increases beyond the capacity of terminal servers 120, 130, and 140, load balancer 156 operates to instantiate one or more additional terminal servers to meet the increased session load. An increase in the session load can be due to an increase in the overall number of sessions that are logged on, due to an increase in the session demand for a particular application 160, 162, 164, and 166, due to a new session demand for a specialized application that requires a unique terminal server configuration, or due to other increases in the session load on RDSH 100. In another case, where the session load decreases, load balancer 156 operates to consolidate the decreased session load onto fewer terminal servers 120, 130, and 140, and to shut down one or more of the underutilized terminal servers.

A decrease in the session load can be due to a decrease in the overall number of sessions that are logged on, due to a decrease in the demand for a particular application 160, 162, 164, or 166, due to the logging off of a session that had demanded a specialized application, or due to other decreases in the session load on RDSH 100. The operation of RDSH system 100 in consolidating sessions and terminal servers in the case where the session load decreases will be discussed further, below, with reference to FIGS. 2 and 3.

Session broker 158 operates to manage the distribution of sessions 170 thru 192 on terminal servers 120, 130, and 140. In a first case, where a new session is logged on to RDSH system 100, session broker 158 evaluates the new session request and determines if a suitable terminal server 120, 130, or 140 is available to host the new session. If none of the existing terminal servers 120, 130, or 140 are determined to be suitable, such as when all of the terminal servers are hosting at capacity, or when no terminal server is instantiated that meets the application needs of the new session, session broker 158 requests load balancer 156 to instantiate a new terminal server to meet the needs of the new session. Once a suitable terminal server 120, 130, 140, or a newly instantiated terminal server is identified, session broker 158 directs the identified terminal server to host the new session and to log-on the user of the new session. In another case, where an existing session 170 thru 192 is logged off from RDSH system 100, session broker 158 notifies load balancer 156 of the freed-up resources of the associated terminal server 120, 130, or 140 so that the load balancer can operate to consolidate the sessions or the terminal servers, as described above.

Figure 2:
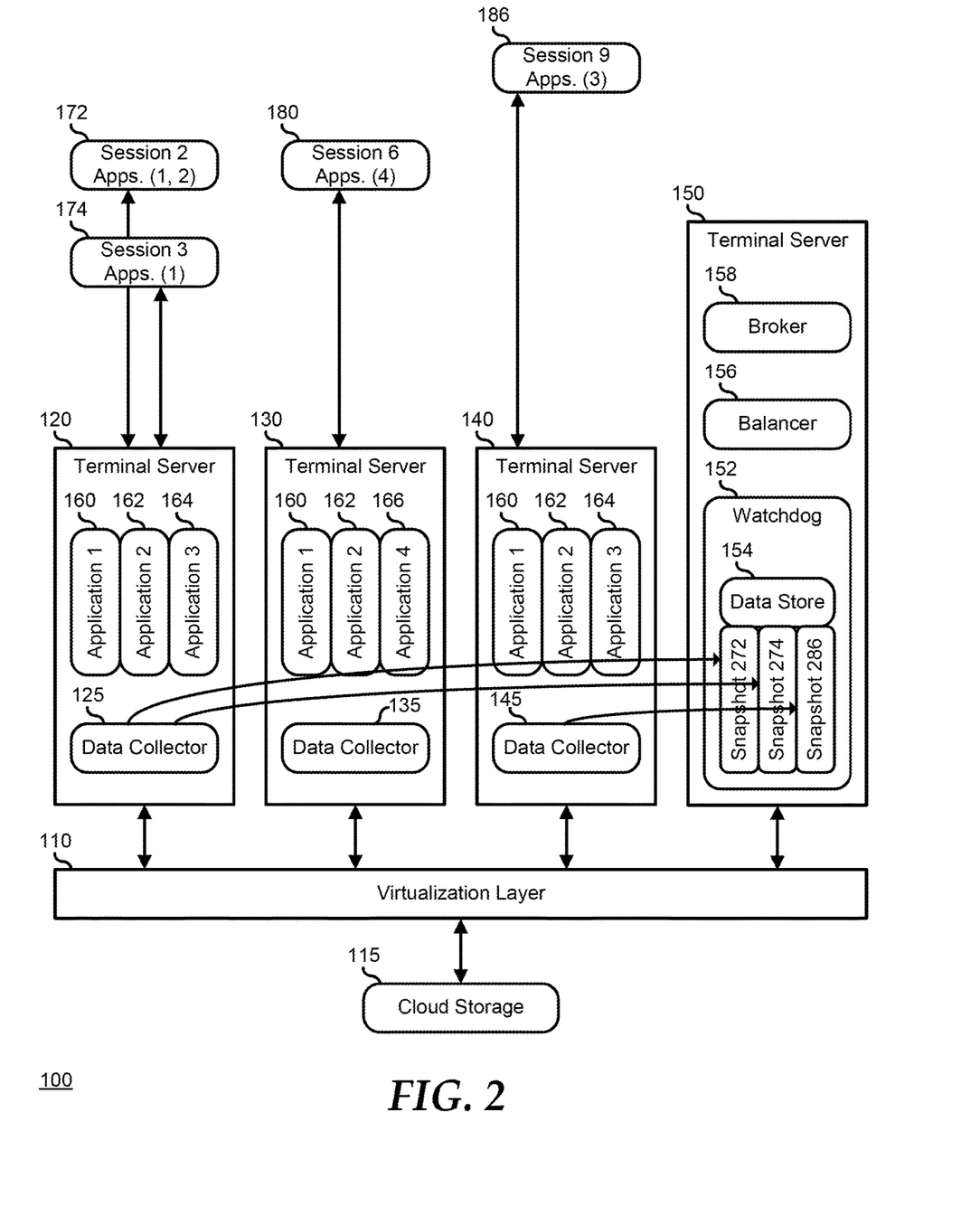
Figure 3:
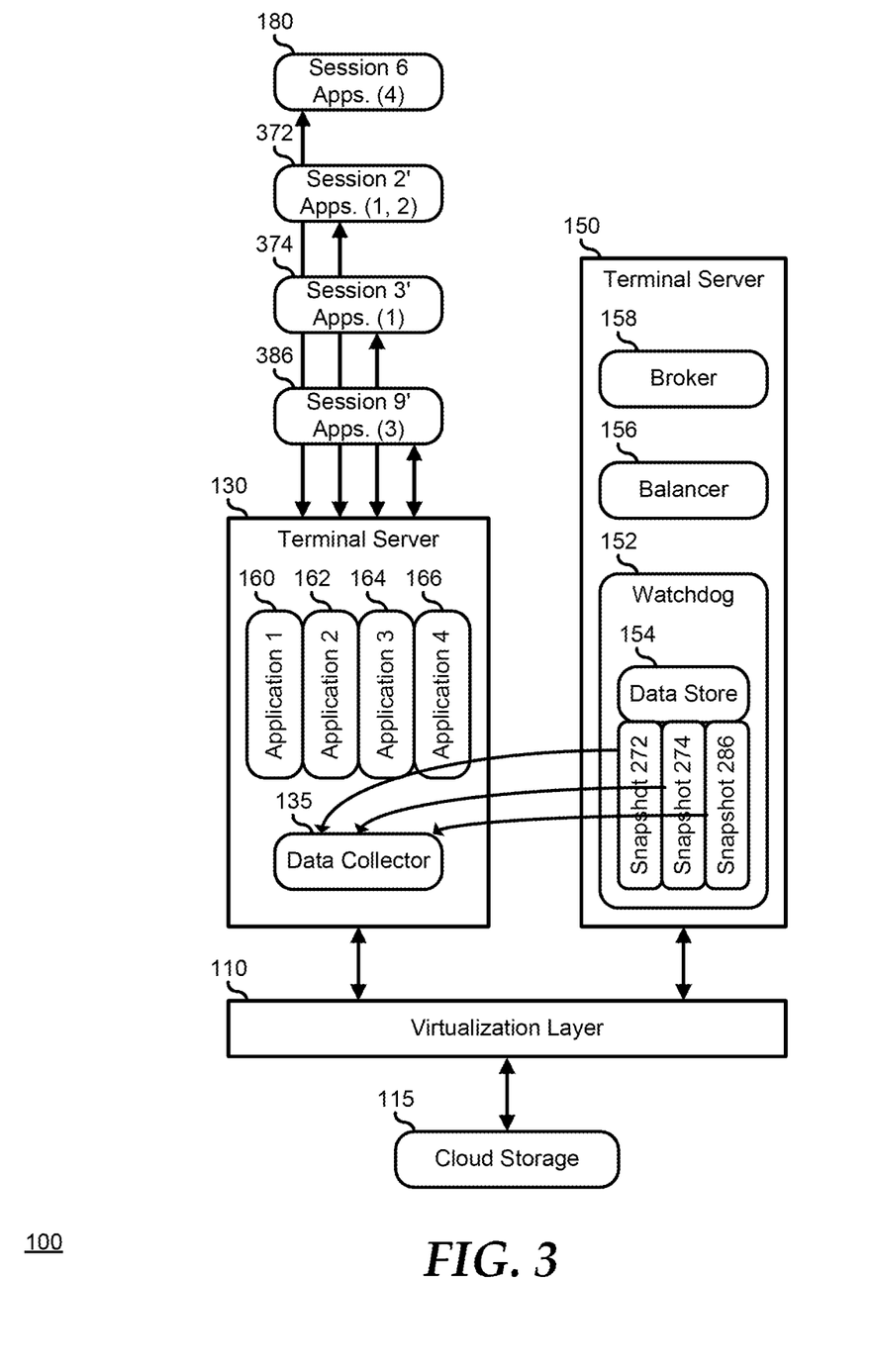

FIGS. 2 and 3 illustrate a case where RDSH system 100 has experienced a decrease in the session load on the RDSH system. In FIG. 2, sessions 172 and 174 remain logged on to terminal server 120, session 180 remains logged on to terminal server 130, and session 186 remains logged on to terminal server 140. For example, one or more of sessions 170, 176, 178, 182, 184, 188, 190, and 192 can have been logged off respective terminal servers 120, 130, and 140, the sessions can have timed out, the time of day can have arrived when the sessions are determined by a policy to be logged out, or the sessions can have otherwise been logged off. At this time, load balancer 156 determines that a consolidation of terminal servers 120 and 140 can be performed by migrating sessions 172 and 174 from terminal server 120 onto terminal server 130 and by migrating session 186 from terminal server 140 onto terminal server 120. For example, where application 166 requires a unique configuration of terminal server 130, but terminal 130 is also deemed to be capable of running application 164, load balancer 156 can select terminal serve 130 to remain and can select terminal servers 120 and 140 to be shut down, as illustrated in FIG. 3.

Here, before migrating sessions, session broker 158 places terminal servers 120 and 140 into a drain mode, such that terminal servers 120 and 140 do not service any further log on requests to launch new sessions, and the session broker will redirect new session requests to terminal server 130. At this time, data collector 125 generates snapshots 272 and 274 for sessions 172 and 174, stores the snapshots in data storage device 158, and provides notices to sessions 172 and 174 that the sessions will be logged off in a predetermined amount of time. The notifications allow users of sessions 172 and 174 sufficient time to save any data that they wish to save, for example by storing the data on cloud storage device 115, before data collector 125 logs off sessions 172 and 174. Similarly, data collector 145 generates snapshot 286 for session 186, stores the snapshot in data storage device 158, and provides a notice to session 186 that the session will be logged off in a predetermined amount of time. The notification allows a user of session 186 sufficient time to save any data that they wish to save, for example by storing the data on cloud storage device 115, before session broker 158 logs off session 186. The users of sessions 172, 174, and 186 are also provided with an option to reestablish their respective sessions, or to remain logged off. If a user chooses to remain logged off, then the associated session will not be logged back on as described below. Hereinafter, it is assumed that the users of sessions 172, 174, and 186 have indicated the desire to be logged back on.

In FIG. 3, sessions 172, 174, and 186 have been logged off, and terminal servers 120 and 140 have been shut down. Here, session 180 remains logged on to terminal server 130. Session broker 158 launches a new session 372 that is associated with session 172, as indicated by the name "Session 2'". After the user of session 172 logs on to session 372, data collector 135 provides a notice to the user to determine if the user wants to establish session 372 as a clone of session 172. If so, data collector 135 retrieves snapshot 272 associated with session 172, and configures session 372 in accordance with the snapshot. Sessions 374 and 386 are associated with sessions 174 and 186, respectively, and are launched and provisioned similarly to session 372. If the user of session 186 wants to establish session 386 as a clone of session 186, then data collector 135 launches application 164 on terminal server 130, and access to the application is provided to session 386. The decision by load balancer 156 to select terminal server 130 is exemplary, and the load balancer can select another terminal server for other reasons, as needed or desired. For example, load balance 156 can select terminal server 120 because two sessions (sessions 172 and 174) are already established on terminal server 120, and thus only two sessions (sessions 180 and 186) would need to be migrated.

Figure 4:
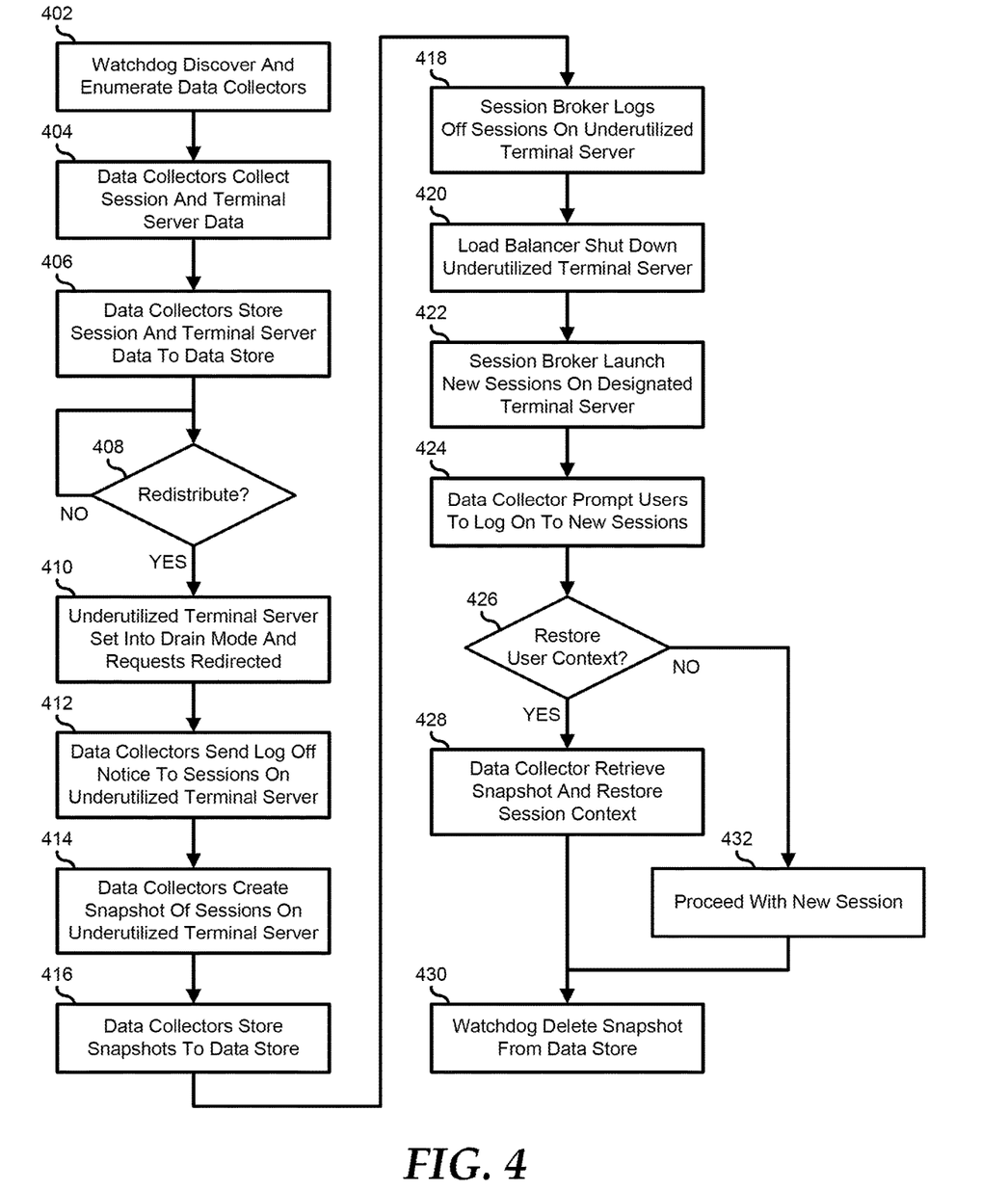
FIG. 4 is a flowchart illustrating a method for live migration of remote desktop session host sessions without data loss according to an embodiment of the present disclosure.

FIG. 4 illustrates a method for live migration of remote desktop session host sessions without data loss, starting at block 402, where a watchdog of a RDSH system discovers and enumerates the data collectors on the terminal servers of the RDSH system. For example, watchdog 152 can discover and enumerate data collectors 125, 135, and 145 on terminal servers 120, 130, and 140. The data collectors collect session data and terminal server data in block 404. Here, data collectors 125, 135, and 145 can collect session data on respective sessions 170 thru 192, and can collect terminal server data on respective terminal servers 120, 130, and 140. The data collectors store the session data and the terminal server data on a data storage device of the watchdog in block 406. For example, data collectors 125, 135, and 145 can store session data and terminal server data on data storage device 154. The method then enters a loop at decision block 408 where a decision is made as to whether or not a redistribution of terminal servers is needed. For example, load balancer 156 can determine whether or not one or more of terminal servers 120, 130, and 140 are underutilized. If redistribution is not needed, the "NO" branch of decision block 408 is taken and the method loops to decision block 408 until redistribution is needed.

When it is determined that a redistribution of the terminal servers is needed, the "YES" branch of decision block 408 is taken and a terminal server that has been designated as underutilized by the load balancer is set into the drain mode such that new requests to the designated terminal server for new sessions are blocked from the designated terminal server and are redirected to a different terminal server in block 410. The data collectors send log off notifications to the sessions on the underutilized terminal servers in block 412, create snapshots of the sessions on the underutilized terminal servers in block 414, and send the snapshots to the data storage device in block 416.

After a predetermined time, a session broker logs off the sessions on the underutilized terminal servers in block 418, and a load balancer shuts down the underutilized terminal servers in block 420. For example, session broker 158 can shut down sessions 170 and 176 on terminal server 120, and load balancer 156 can shut down terminal server 120. The session broker launches new sessions for the logged off sessions on the designated terminal server in block 422. Here, session broker 158 can launch sessions 372, 374, and 386 on terminal server 130. The data collector prompts the users of the newly launched sessions to log onto the sessions in block 424.

After the users log on, a decision is made as to whether or not to restore the context of the previous session, that is, to clone the closed session on the newly created session in decision block 426. If the user decides to restore the context to the newly created session, the "YES" branch of decision block 426 is taken, the data collector retrieves the snapshot for the session and restores the context of the logged off session in block 428, the watchdog deletes the snapshot for that session from the data storage device in block 430, and the method ends. If the user decides not to restore the context to the newly created session, the "NO" branch of decision block 426 is taken, the user proceeds to work with the new session in block 432, the watchdog deletes the snapshot for that session from the data storage device 430, and the method ends.

The skilled artisan will recognize that the present disclosure is applicable to multiple types of RDSH systems, where the terminal servers are hardware servers in a data farm, are virtual servers in a virtualized environment, or are a combination of hardware servers and virtual servers, without violating the spirit of the present disclosure.

Figure 5:
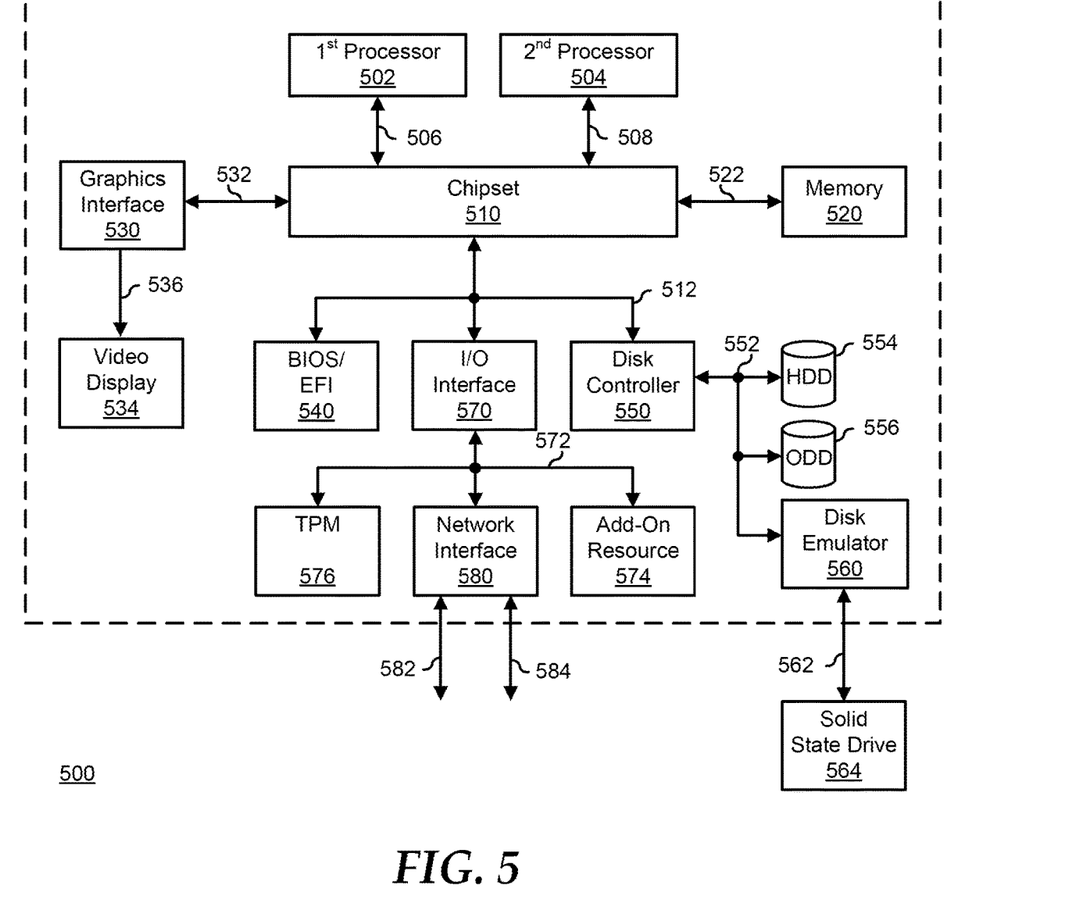
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A remote desktop session host system comprising:
   a first terminal server including a first data collector, the first terminal server to host a first terminal session associated with a first application and a first user, and a second terminal session associated with a second application and a second user;
   a second terminal server including a second data collector;
   a data storage device; and
   a watchdog that discovers the first and second data collectors, receives session information from the first and second data collectors, stores the session information in the data storage device, provides policies to the first and second data collectors, and monitors resource allocations in the first and second terminal servers;
   wherein in response to determining that the first terminal server is underutilized:
      the first data collector creates a first snapshot of the first terminal session and a second snapshot of the second terminal session, the first snapshot including a first context for the first terminal session and the first application, and the second snapshot including a second context for the second terminal session and the second application, the first data collector stores the first and second snapshots on the data storage device, and the first data collector logs off the first terminal session and the second terminal session;
      a third terminal session is launched on the second terminal server; and
      the second data collector requests the first user to log on to the third terminal session, receives a third indication that the first user desires to restore the first context to the third terminal session, retrieves the first snapshot in response to the third indication, provides the first snapshot to the third terminal session to restore the first context to the third terminal session, launches the first application on the second terminal server, and deletes the first snapshot in response to providing the first snapshot to the third terminal session.

2. The remote desktop session host system of claim 1, further comprising:
   a load balancer that determines that the first terminal server is underutilized, and, in response to the first data collector logging off the first terminal session and the second terminal session, that shuts down the first terminal server.

3. The remote desktop session host system of claim 2, wherein further:
   the load balancer determines to migrate the first terminal session from the first terminal server to the second terminal server; and
   the third terminal session is launched on the second terminal server in response to the load balancer determining to migrate the first terminal session.

4. The remote desktop session host system of claim 1, further comprising:
   a session broker that launches the third terminal session on the second terminal server.

5. The remote desktop session host system of claim 1, wherein, prior to the first data collector logging off the first terminal session and the second terminal session, the first terminal session stores data generated in the first terminal session to a cloud storage device.

6. The remote desktop session host system of claim 1, wherein in further response to determining that the first terminal server is underutilized, the first terminal server is placed into a drain mode, such that a request to launch a fourth terminal session on the first terminal server is redirected to the second terminal server.

7. A method comprising:
   hosting a first terminal session associated with a first application and a first user on a first terminal server, and a second terminal session associated with a second application and a second user on the first terminal server;
   determining that the first terminal server is underutilized;
   creating, by a first data collector of the first terminal server, a first snapshot of the first terminal session and a second snapshot of the second terminal session, the first snapshot including a first context for the first terminal session and the first application, and the second snapshot including a second context for the second terminal session and the second application;

discovering, by a watchdog module, the first data collector;

storing, by the watchdog module, the first and second snapshots on a data storage device;

logging off the first and second terminal sessions on the first terminal server;

launching a third terminal session on a second terminal server;

requesting, by a second data collector on the second terminal server, the first user to log on to the third terminal session;

discovering, by the watchdog module, the second data collector;

receiving a third indication that the first user desires to restore the first context to the third terminal session;

retrieving, by the watchdog module, the first snapshot in response to the third indication;

providing the first snapshot to the third terminal session to restore the first context to the third terminal session;

launching the first application on the second terminal server; and deleting the first snapshot in response to providing the first snapshot to the third terminal session.

8. The method of claim 7, wherein a load balancer determines that the first terminal server is underutilized, the method further comprising:

shutting down the first terminal server in response to the first data collector logging off the first terminal session and the second terminal session.

9. The method of claim 8, further comprising:

determining to migrate the first terminal session from the first terminal server to the second terminal server, wherein launching the third terminal session is in response to determining to migrate the first terminal session.

10. The method of claim 7, wherein a session broker launches the third terminal session on the second terminal server.

11. A non-transitory computer-readable medium including code for performing a method, the method comprising:

hosting a first terminal session associated with a first application and a first user on a first terminal server, and a second terminal session associated with a second application and a second user on the first terminal server;

determining that the first terminal server is underutilized;

creating, by a first data collector of the first terminal server, a first snapshot of the first terminal session and a second snapshot of the second terminal session, the first snapshot including a first context for the first terminal session and the first application, and the second snapshot including a second context for the second terminal session and the second application;

discovering, by a watchdog module, the first data collector;

storing, by the watchdog module, the first and second snapshots on a data storage device;

logging off the first terminal session and the second terminal session;

launching a third terminal session on a second terminal server;

requesting, by a second data collector on the second terminal server, the first user to log on to the third terminal session;

discovering, by the watchdog module, the second data collector;

receiving a third indication that the first user desires to restore the first context to the third terminal session;

retrieving, by the watchdog module, the first snapshot in response to the third indication;

providing the first snapshot to the third terminal session to restore the first context to the third terminal session;

launching the first application on the second terminal server; and deleting the first snapshot in response to providing the first snapshot to the third terminal session.

12. The computer-readable medium of claim 11, wherein a load balancer determines that the first terminal server is underutilized, and the method further comprises:

shutting down the first terminal server in response to the first data collector logging off the first terminal session and the second terminal session; and determining to migrate the first terminal session from the first terminal server to the second terminal server, wherein launching the third terminal session is in response to determining to migrate the first terminal session.

13. The computer-readable medium of claim 11, wherein the first context includes an application that is hosted by the first terminal server and that is utilized by the first terminal session, and the method further comprises:

launching the application on the second terminal server.

14. The remote desktop session host system of claim 1, wherein in further response to determining that the first terminal server is underutilized:

a fourth terminal session is launched on the second terminal server; and the second data collector requests the second user to log on to the fourth terminal session, receives a fourth indication that the second user desires to restore the second context to the fourth terminal session, retrieves the second snapshot in response to the fourth indication, provides the second snapshot to the fourth terminal session to restore the second context to the third terminal session, launches the second application on the second terminal server, and deletes the second snapshot in response to providing the second snapshot to the fourth terminal session.

15. The method of claim 7, further comprising:

launching a fourth terminal session on a second terminal server;

requesting, by the second data collector, the second user to log on to the fourth terminal session;

receiving a fourth indication that the second user desires to restore the second context to the fourth terminal session;

retrieving the second snapshot in response to the fourth indication;

providing the second snapshot to the fourth terminal session to restore the second context to the fourth terminal session;

launching the second application on the second terminal server; and deleting the second snapshot in response to providing the second snapshot to the fourth terminal session.

16. The computer-readable medium of claim 11, further comprising:

launching a fourth terminal session on a second terminal server;
requesting, by the second data collector, the second user to log on to the fourth terminal session;
receiving a fourth indication that the second user desires to restore the second context to the fourth terminal session;
retrieving the second snapshot in response to the fourth indication;
providing the second snapshot to the fourth terminal session to restore the second context to the fourth terminal session;
launching the second application on the second terminal server; and
deleting the second snapshot in response to providing the second snapshot to the fourth terminal session.

\* \* \* \* \*